F. A. YOUNG.
TURF CUTTER.
APPLICATION FILED APR. 7, 1910.
1,022,995.
Patented Apr. 9, 1912.
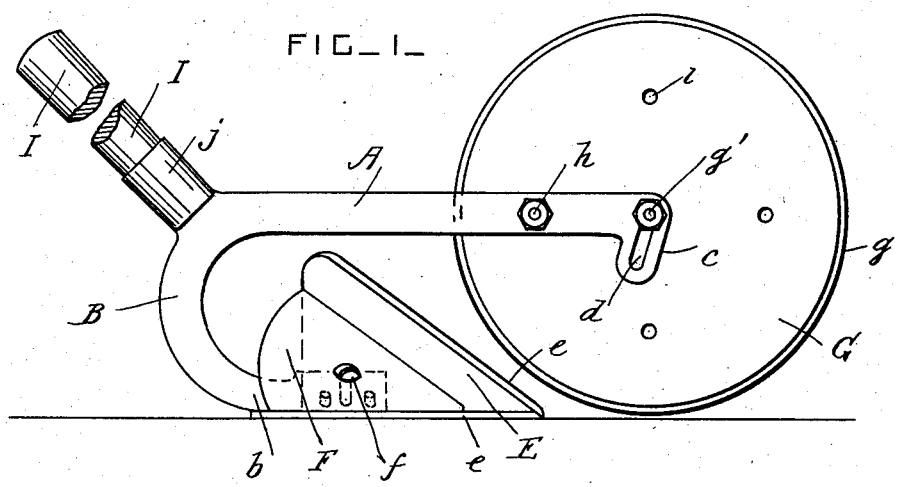
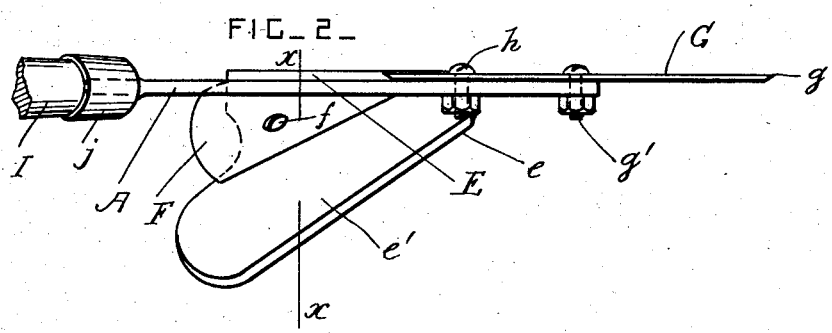
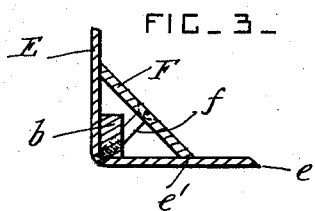
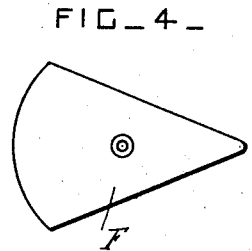
Witnesses
E. B. Corcoran
H. T. Corcoran
Inventor
Fred A. Young.
By Herbert W. P. Jenner.
Attorney
COLUMBIA PLANOGRAPH CO., WASHINGTON, D. C.

UNITED STATES PATENT OFFICE.

FRED A. YOUNG, OF RUTLAND, VERMONT.

TURF-CUTTER.

1,022,995.

Specification of Letters Patent.

Patented Apr. 9, 1912.

Application filed April 7, 1910. Serial No. 554,030.

*To all whom it may concern:*

Be it known that I, FRED A. YOUNG, a citizen of the United States, residing at Rutland, in the county of Rutland and State of Vermont, have invented certain new and useful Improvements in Turf-Cutters; and I do hereby declare the following to be a full, clear, and exact description of the invention, such as will enable others skilled in the art to which it appertains to make and use the same.

This invention relates to cutters for turf and sod; and it consists in the novel construction and combination of the parts hereinafter fully described and claimed.

In the drawings, Figure 1 is a side view of the turf cutter. Fig. 2 is a plan view of the same. Fig. 3 is a cross-section through the lower blade, taken on the line $x$—$x$ in Fig. 2. Fig. 4 is a detail view of the adjusting plate.

A is a supporting bar provided with a curved rear end portion B having an arm $b$ arranged substantially parallel with and below the rear part of the bar A. The bar A has a lug $c$ at its front end which is provided with a downwardly inclined slot $d$.

E is the lower cutter and guide which is formed of a substantially triangular plate bent to form a right angle on a line from one of its angles to the middle of the side opposite said angle. The cutter has sharp cutting edges $e$ at its front, and the lower and horizontal portion $e'$ of the cutter forms a guide which runs on the ground.

F is an adjustable plate of triangular form secured in the angle between the vertical and horizontal portions of the cutter E, by means of a screw $f$. The position of this plate can be adjusted, or it can be removed altogether, and plates of different size can be substituted for it. When the plate F is removed the machine can be used as a sod cutter. When the plate F is secured as shown the machine is adapted to cut grass at the edge of a lawn, and it discharges the cut grass clear of the lawn so that it can be swept up easily.

G is a circular cutter secured in front of and above the vertical portion of the cutter E. The cutter G has a sharp edge $g$ all around it, and it can be turned around as the cutting edge becomes blunt. The cutter G is secured by means of a central bolt $g'$ which passes through the slot $d$, so that the position of the cutter G can be adjusted vertically with reference to the vertical portion of the cutter E. A clamping bolt $h$ also secures the cutter G to the bar A after it has been turned to the desired position, and the bolt $h$ engages with any hole of a series of holes $i$ in the cutter G.

I is a handle which is secured to a socket $j$ at the rear end portion of the bar A. The machine is pushed along by means of the handle and it is used chiefly to trim the turf at the edges of lawns.

What I claim is:

1. In a turf cutter, the combination, with a supporting frame having a slotted lug at its front end, and a lower cutter at the rear part of the said frame; of a front cutter, a bolt slidable in the said slotted lug and connecting the front cutter thereto and permitting it to be adjusted vertically, and a fastening device arranged eccentric of the said bolt and connecting the front cutter to the frame, thereby preventing the front cutter from being revolved upon the said bolt while it is being adjusted vertically.

2. In a turf cutter, the combination, with a supporting bar having an arm extending under its rear part, of a handle secured to the rear part of the said bar, a lower cutter secured to the said arm and having vertical and horizontal portions, a triangular plate secured in the angle between the vertical and horizontal portions of the lower cutter, and a vertical cutter secured to the front end portion of the said bar above and in front of the vertical portion of the lower cutter.

3. In a turf cutter, the combination, with a supporting bar having an arm extending under its rear part and having also a slot at its front end portion, of a handle secured to the rear part of the said bar, a lower cutter secured to the said arm and having vertical and horizontal portions, and a vertical cutter disk adjustable circumferentially and provided with a central bolt which is movable in the said slot, said disk being arranged above and in front of the vertical portion of the lower cutter and adjustable vertically with reference to it.

4. In a sod cutter, a frame bar of substantially U-shape having a slotted lug formed on one end thereof and adapted to receive and permit of vertical adjustment of an axle, an axle secured in the slot, a cutting disk mounted on the axle, and a locking bolt carried by the U-bar and engaging the disk and adapted to serve as a pivot for the disk as the axle is adjusted.

5. A sod cutter, comprising a handle, a U-shaped frame member having a socket formed thereon to receive the handle, an angular knife blade secured to one end of the frame member, and a circular knife member at the other end of the frame member, said knife being provided with an eccentric pivot and with a vertically adjustable axial pivot for regulating the depth of cut of the knife member.

In testimony whereof I have affixed my signature in the presence of two witnesses.

FRED A. YOUNG.

Witnesses:
CHARLES YOUNG,
LOUIS DURVIAGE.

Copies of this patent may be obtained for five cents each, by addressing the "Commissioner of Patents, Washington, D. C."